July 28, 1931.   I. AMUNDSEN   1,815,961
REFRIGERATOR OF THE ADSORPTION TYPE
Original Filed March 10, 1930
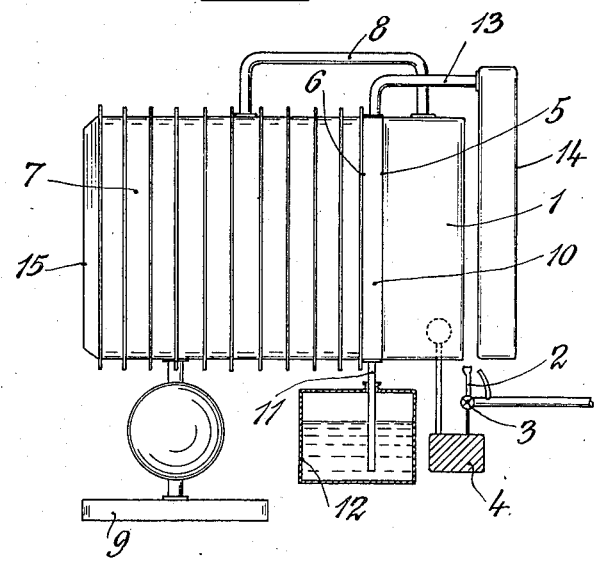
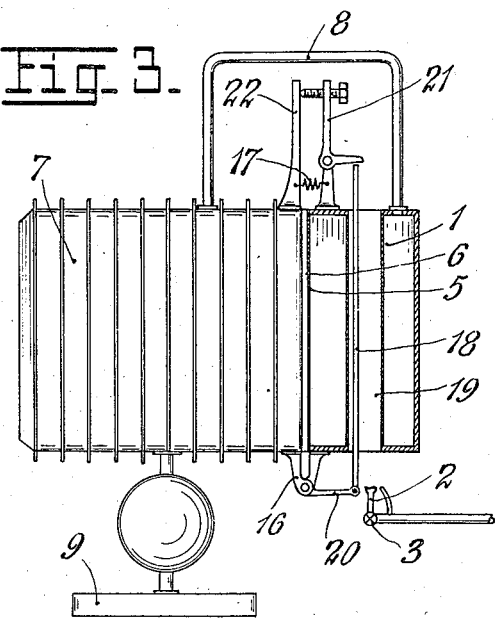
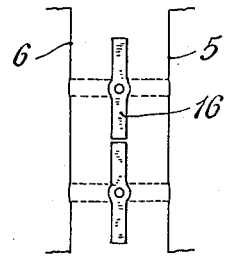
Inventor:-
Ivar Amundsen
by
Langner, Parry, Card & Langner
Attys.

Patented July 28, 1931

1,815,961

UNITED STATES PATENT OFFICE

IVAR AMUNDSEN, OF OSLO, NORWAY

REFRIGERATOR OF THE ADSORPTION TYPE

Application filed March 10, 1930, Serial No. 434,739. Renewed June 16, 1931.

The present invention relates to refrigerators of the adsorption types of the kind in which the adsorption vessel is intermittently heated and cooled in order to intermittently liberate and adsorb refrigerating fluid.

The main object of the invention is to provide a refrigerator of this kind, which is adapted to operate economically without being connected to a supply of cooling liquid, the amount of heat to be dispensed with being carried away by means of the surrounding air.

The main difficulty to be dealt with in refrigerators of this kind, when no continuous supply of cooling liquid is utilized, lies in the provsion of effective cooling surfaces for transferring the heat from the adsorption vessel to the surrounding air.

This difficulty may be overcome by providing mechanical means for causing a strong current of cooling air to pass the surfaces, from which heat is to be transmitted, but this means a serious complication of the apparatus, as it necessitates the use of an electrically or mechanically operated fan or the like.

In accordance with the present invention the apparatus comprises besides the adsorption vessel a heat accumulating body having an extensive cooling surface exposed to the surrounding air, said adsorption vessel and said heat accumulating body having substantially parallel heat transmitting surfaces located adjacent each other, means being provided for establishing and interrupting heat exchanging relations between the said heat transmitting surfaces.

Thus, when the adsorption vessel has been heated from a suitable source of heat, such as a gas jet or an electric heating element for a suitable period of time, the means referred to are operated so as to establish heat exchanging relations between the said heat transmitting surfaces, and the heat accumulated in the adsorption vessel will be rapidly transmitted to the said accumulating body, the heat accumulating capacity of which is many times larger than that of the adsorption vessel and the adsorption medium.

The temperature of the heat accumulating body will accordingly rise only slightly during the transmission of heat from the adsorption vessel, and a rapid cooling of the adsorption vessel is secured.

The accumulating body being provided with an extensive cooling surface in contact with the surorunding air, will transfer the heat transmitted to the same from the adsorption vessel during the adsorption and the subsequent heating period, and will be ready to take up a further amount of heat from the adsorption vessel when the said heating or liberating period has terminated.

According to a preferred embodiment of the invention, the said heat accumulating body is made in the form of a vessel containing a liquid, said vessel being also utilized as condensing vessel for the adsorption fluid liberated during the heating period from the adsorption vessel.

The means for establishing and interrupting heat exchanging relations between the adjacent heat transmitting surfaces of adsorption vessel and heat accumulating body, may preferably be controlled directly or indirectly from the intermittently operating heating means for the adsorption vessel.

The establishing and interrupting of heat exchanging relations between the said two surfaces may take place by causing the adsorption vessel and accumulating body to perform a slight movement with regard to each other, so as to bring their adjacent heat transmitting surfaces in close contact, or at a slight distance from each other.

The said movement may easily be controlled by means of a thermostat device or the like associated with the heating means.

In accordance with a preferred embodiment of the invention the adsorption vessel and accumulating body are stationary with regard to each other, and heat exchanging relations between their adjacent heat transmitting surfaces are caused by filling the space between the said heat transmitting surfaces with a heat conductive body, which acts to transmit the heat from one surface to the other.

The said heat transmitting body may be in the form of pivoted dampers of a good heat conductive material adapted to be brought to their parallel edges in contact with both heat transmitting surfaces, or the heat transmitting medium may consist of a liquid adapted to be introduced into and removed from the space between the said heat transmitting surfaces.

On the drawings some embodiments of the invention are illustrated diagrammatically.

Fig. 1 is a diagrammatical sectional view of one embodiment of the invention, Fig. 2 is a detail on a larger scale of a modification, and Fig. 3 is a diagrammatical sectional view of another embodiment of the invention.

In accordance with the form of the invention illustrated on Fig. 1, 1 is an adsorption vessel which is heated by means of a gas jet 2, the combustion gases from which pass along one side of the adsorption vessel.

The gas jet is opened and shut at suitable intervals by means of a cock 3 actuated by a suitable thermostatic device 4, controlled by the temperature in the interior of the adsorption vessel 1. The operation of the intermittent heating means is well known in adsorption refrigerators of similar types, and does not form any part of the present invention.

The surface 5 of the adsorption vessel, which is opposite the surfaces heated by means of the gas jet, is located a short distance away from the parallel surface 6 of a condenser vessel 7 containing a comparatively large body of water or other suitable liquid, so as to operate as a condenser for the gases liberated from adsorption vessel 1 in the usual manner. 8 is the conduit connecting adsorption vessel 1 with condenser vessel 7, and 9 is the evaporator from which the condensed refrigerating fluid is evaporated by means of heat taken up from the refrigerator cabinet (not shown).

The narrow space 10 between the adjacent parallel surfaces 5, 6 communicates at the lower end through a tube 11 with the lower part of a tank or vessel 12 containing a liquid, such as water. The upper part of the said space 10 communicates through tube 13 with a closed gas or air filled vessel 14, located adjacent the gas jet 2, so as to be heated by the same.

When the heating means do not operate, space 10 is completely filled with liquid. This may be obtained by suitably regulating the pressure in tank 12 or by placing tank 12 at the desired level. When the heating is started, the air or gas in vessel 14 will expand and will press the liquid out of space 10 into storage tank. 12.

During the heating of the adsorption vessel the same will accordingly be insulated from the condenser vessel 7 by the air-filled space 10.

As soon as the heating is interrupted, the air in vessel 14 will again cool down, the pressure in space 10 will decrease, and the liquid will flow back into the said space from storage tank 12, so as to establish heat exchanging relations between the surface 5 of the heat adsorber vessel 1 and the surface 6 of the cold or cool condenser vessel 7.

As the heat accumulating capacity of the said condenser vessel is many times larger than that of the adsorber vessel and the adsorption medium, the transmission of heat accumulated in the adsorber vessel to the condenser vessel will only cause a slight rise in the temperature of the latter, and the heat transmitted to the condenser vessel will be transferred to the surrounding air from the extensive cooling surfaces of the condenser vessel, which is preferably provided with cooling ribs or the like, as indicated at 15.

In case the same liquid, for instance water, is used for filling the condenser vessel 7 as well as for filling the space 10, the tank 12 may be dispensed with, and space 10 may be connected at its lower end with the interior of tank 7.

Instead of using a liquid, such as water, for establishing heat exchanging relations between surfaces 5 and 6, the same object may be attained as indicated on Fig. 2, by means of pivoted dampers 16 adapted to be controlled by a suitable thermostatic device from the heating means, so as to automatically take up the position shown in full lines during the heating period, and the position shown in dotted lines during the cooling period, so as to permit the transmission of heat from surface 5 to surface 6 during that period.

In accordance with the form of the invention illustrated on Fig. 3, the adsorption vessel 1 is adapted to perform a slight movement towards and away from the condenser vessel 7, in order that the adjacent surfaces 5, 6 may be brought into close contact with each other to establish heat exchanging relations, or removed from each other during the period of heating.

As it will be seen on the drawings, the adsorption vessel is hinged to the condenser vessel 7 at 16, a spring 17 connecting the two vessels at their upper end and tending to keep surfaces 5, 6 in close contact with each other.

The thermostatic device serving to automatically interrupt the contact between surfaces 5 and 6 during the heating period, consists of a rod 18 of steel or other suitable material, with a high heat expansion coefficient located in the heating flue 19, passing through th adsorption vessel, so as to be heated by the gas jet, when this is in operation.

At its lower end the said rod 18 is supported by means of a stationary bracket 20 or the like, and at its upper end abuts against one arm of a bell crank lever 21, the other arm of which engages an abutment 22 on the condenser tank 7.

The heating of rod 18 will cause bell crank lever 21 to swing in the direction of the arrow, thus swinging adsorption vessel away from the condenser vessel 6.

I claim:

1. In a refrigerator of the adsorption type an adsorption vessel, means for intermittently heating the same, a heat accumulating body, said adsorption vessel and said heat accumulating body having adjacent substantially parallel surfaces and means for establishing heat exchanging relations between said adjacent surfaces.

2. In a refrigerator of the adsorption type an adsorption vessel, means for intermittently heating the same, a vessel containing a body of liquid, said adsorption vessel and said second vessel having adjacent substantially parallel surfaces and means for establishing heat exchanging relations between said adjacent surfaces.

3. In a refrigerator of the adsorption type an adsorption vessel intermittently operating means for heating the same, a condenser vessel containing a liquid, said adsorption vessel and said condenser vessel having substantially parallel adjacent surfaces and means for establishing heat exchanging relations between the said adjacent surfaces.

4. In a refrigerator of the adsorption type an adsorption vessel intermittently operating means for heating the same, a condenser vessel containing a liquid, said adsorption vessel and said condenser vessel having substantially parallel adjacent surfaces, means for establishing heat exchanging relations between the said adjacent surfaces and means for interrupting said heat exchanging relations.

5. In a refrigerator of the adsorption type an adsorption vessel, intermittently operating means for heating the same, a condenser vessel containing a liquid, said adsorption vessel and said condenser vessel having substantially parallel adjacent surfaces and means for establishing and interrupting heat exchanging relations between said adjacent surfaces.

6. In a refrigerator of the adsorption type an adsorption vessel, intermittently operating means for heating the same, a condenser vessel containing a liquid, said adsorption vessel and said condenser vessel having substantially parallel adjacent surfaces, and means controlled by the said heating means for establishing and interrupting heat exchanging relations between said adjacent surfaces.

7. In a refrigerator of the adsorption type an adsorption vessel, intermittently operating means for heating the same, a vessel containing a body of liquid having a heat storing capacity several times larger than that of the adsorbent, said adsorption vessel and said second vessel having substantially parallel adjacent surfaces and means for establishing and interrupting heat exchanging relations between the said adjacent surfaces.

8. In a refrigerator of the adsorption type an adsorption vessel, intermittently operating means for heating the same, a condenser vessel containing a liquid, said adsorption vessel and said condenser vessel having substantially parallel adjacent surfaces, means for establishing heat exchanging relations between said adjacent surfaces at the termination of each heating period and interrupting said heat exchanging relations at the beginning of the next heating period.

9. In a refrigerator of the adsorption type an adsorption vessel, intermittently operating means for heating the same, a condenser vessel containing a liquid, said adsorption vessel and said condenser vessel having substantially parallel adjacent surfaces and means for filling the space between said adjacent surfaces with a liquid at the termination of each heating period and for removing the said liquid at the beginning of the next heating period.

10. In a refrigerator of the adsorption type an adsorption vessel, intermittently operating means for heating the same, a condenser vessel containing a liquid, said adsorption vessel and said condenser vessel having substantially parallel adjacent surfaces and means for automatically filling the space between said adjacent surfaces with a liquid at the termination of each heating period and for removing the said liquid at the beginning of the next heating period.

11. In a refrigerator of the adsorption type an adsorption vessel, intermittently operated means for heating the same, a condenser vessel containing a liquid, said adsorption vessel and said condenser vessel having substantially parallel adjacent surfaces, and means controlled by the said heating means for automatically filling the space between said adjacent surfaces with a liquid at the termination of each heating period and for removing the said liquid at the beginning of the next heating period.

12. In a refrigerator of the adsorption type an adsorption vessel, means for intermittently heating the same, a heat accumulating body, said adsorption vessel and said heat accumulating body having adjacent substantially parallel surfaces, means comprising a closed gas filled vessel heated by the said heating means for varying the pressure in the space between said adjacent surfaces and a body of liquid communicating with said space.

13. In a refrigerator of the adsorption type an adsorption vessel, means for intermittently heating the same, a heat accumulating body, said adsorption vessel and said heat accumulating body having adjacent substantially parallel surfaces, a conduit connecting the space between said adjacent surfaces with a vessel containing a liquid and means controlled by the said heating means for varying the ratio between the pressure in said space and said vessel.

14. In a refrigerator of the adsorption type an adsorption vessel, means for intermittently heating the same, a heat accumulating body, said adsorption vessel and said heat accumulating body having adjacent substantially parallel surfaces, a body of liquid filling the space between said surfaces, a storage tank communicating with said space, and means for varying the ratio of pressure in said space and storage tank.

15. In a refrigerator of the adsorption type an adsorption vessel, means for intermittently heating the same, a heat accumulating body, said adsorption vessel and said heat accumulating body having adjacent substantially parallel surfaces, a body of liquid filling the space between said surfaces, a storage tank communicating with said space, and means for increasing the pressure in said space in order to transfer liquid from the same to the said storage tank.

16. In a refrigerator of the adsorption type an adsorption vessel, means for intermittently heating the same, a heat accumulating body, said adsorption vessel and said heat accumulating body having adjacent substantially parallel surfaces, a body of liquid filling the space between said surfaces, a storage tank communicating with said space, and means controlled by the heating means for increasing the pressure in said space in order to transfer liquid from the same to the said storage tank.

17. In a refrigerator of the adsorption type an adsorption vessel, means for intermittently heating the same, a heat accumulating body, said adsorption vessel and said heat accumulating body having adjacent substantially parallel surfaces, a body of liquid filling the space between said surfaces, a storage tank communicating with said space, and means comprising a gas filled vessel communicating with said space and adapted to be treated by the said heating means for increasing the pressure in said space in order to transfer liquid from the same to the said storage tank.

18. In a refrigerator of the adsorption type an adsorption vessel, intermittently operating means for heating the same, a condenser vessel containing a liquid, said adsorption vessel and said condenser vessel having adjacent exterior surfaces forming part of the interior surface of an auxiliary vessel, a communication between the lower part of said auxiliary vessel and a storage tank containing a liquid, and means controlled by the heating means for varying the ratio of pressure between said auxiliary vessel and said storage tank, in order to alternatively fill said auxiliary vessel with liquid and remove the said liquid.

19. In a refrigerator of the adsorption type an adsorption vessel, intermittently operating means for heating the same, a condenser vessel containing a liquid, said adsorption vessel and said condenser vessel having adjacent exterior surfaces forming part of the interior surface of an auxiliary vessel, a communication between the lower part of said auxiliary vessel and said condenser vessel, and means controlled by the heating means for varying the ratio of pressure between said auxiliary vessel and said condenser vessel, in order to alternately fill said auxiliary vessel with liquid and remove the said liquid.

20. In a refrigerator of the adsorption type an adsorption vessel, intermittently operating means for heating the same, a condenser vessel containing a liquid, said adsorption vessel and said condenser vessel having adjacent exterior surfaces forming part of the interior surface of an auxiliary vessel, a communication between the lower part of said auxiliary vessel and said condenser vessel, and means comprising a gas-filled vessel communicating with said auxiliary vessel and adapted to be heated by the said heating means for increasing the pressure in said auxiliary vessel in order to transfer liquid from the same to the condenser vessel.

In testimony whereof I affix my signature.

IVAR AMUNDSEN.